United States Patent Office 3,424,290
Patented Jan. 28, 1969

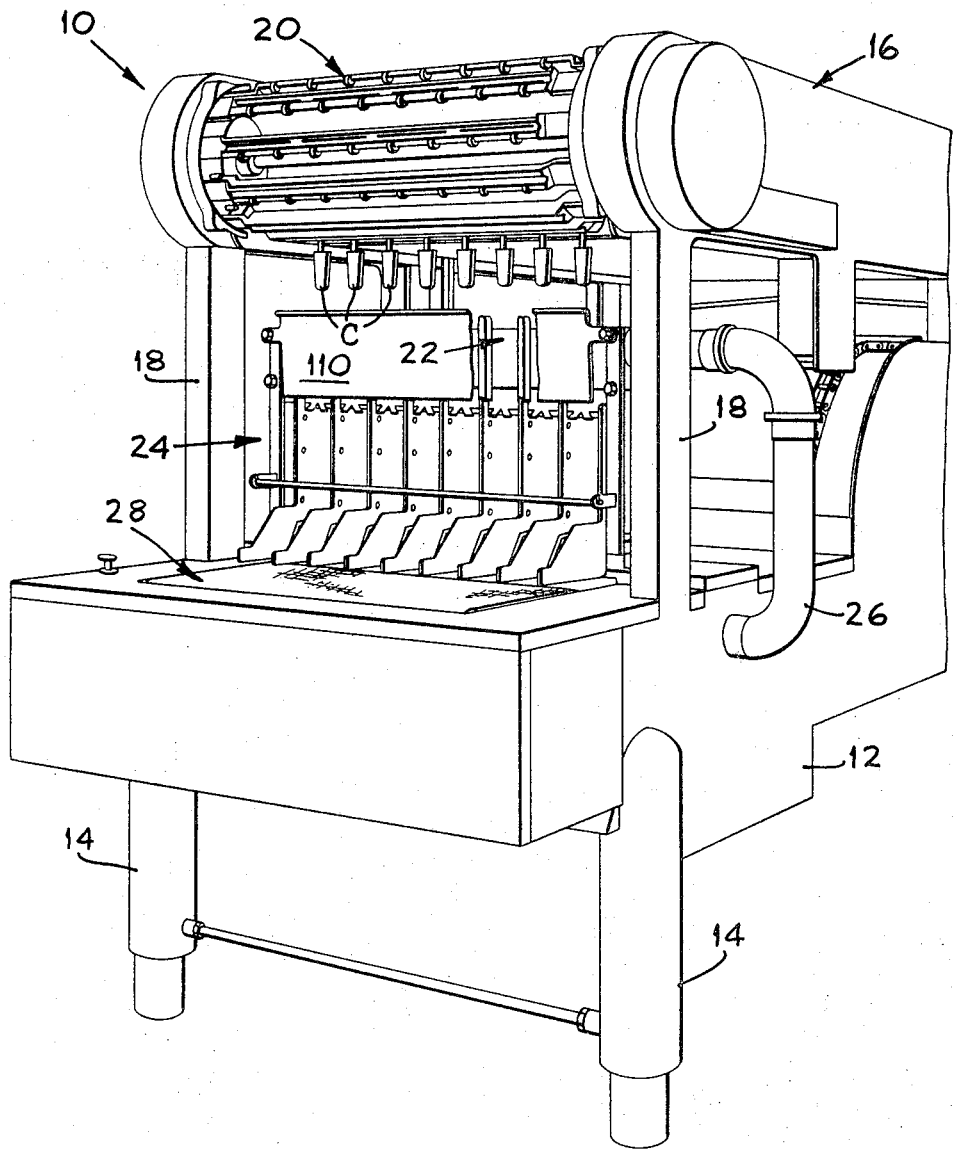

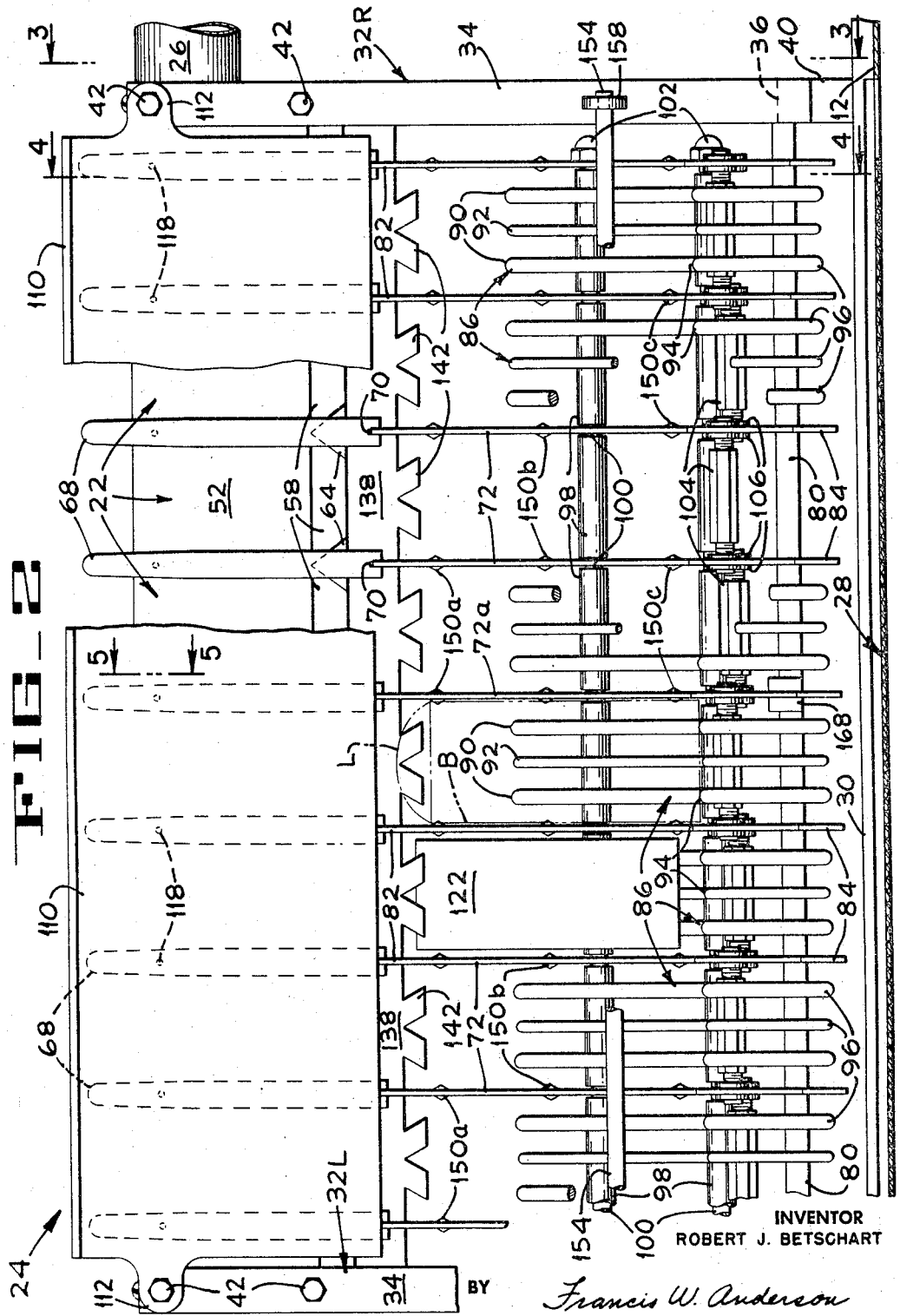

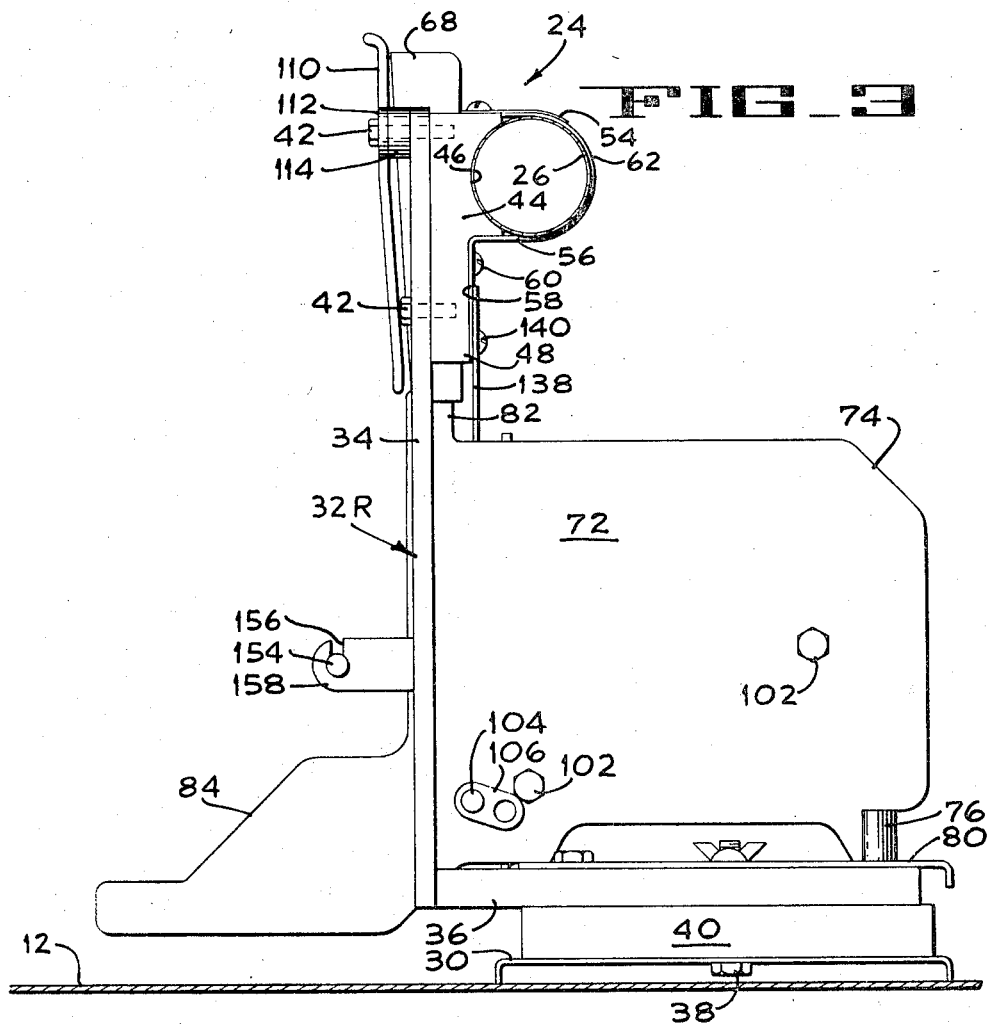

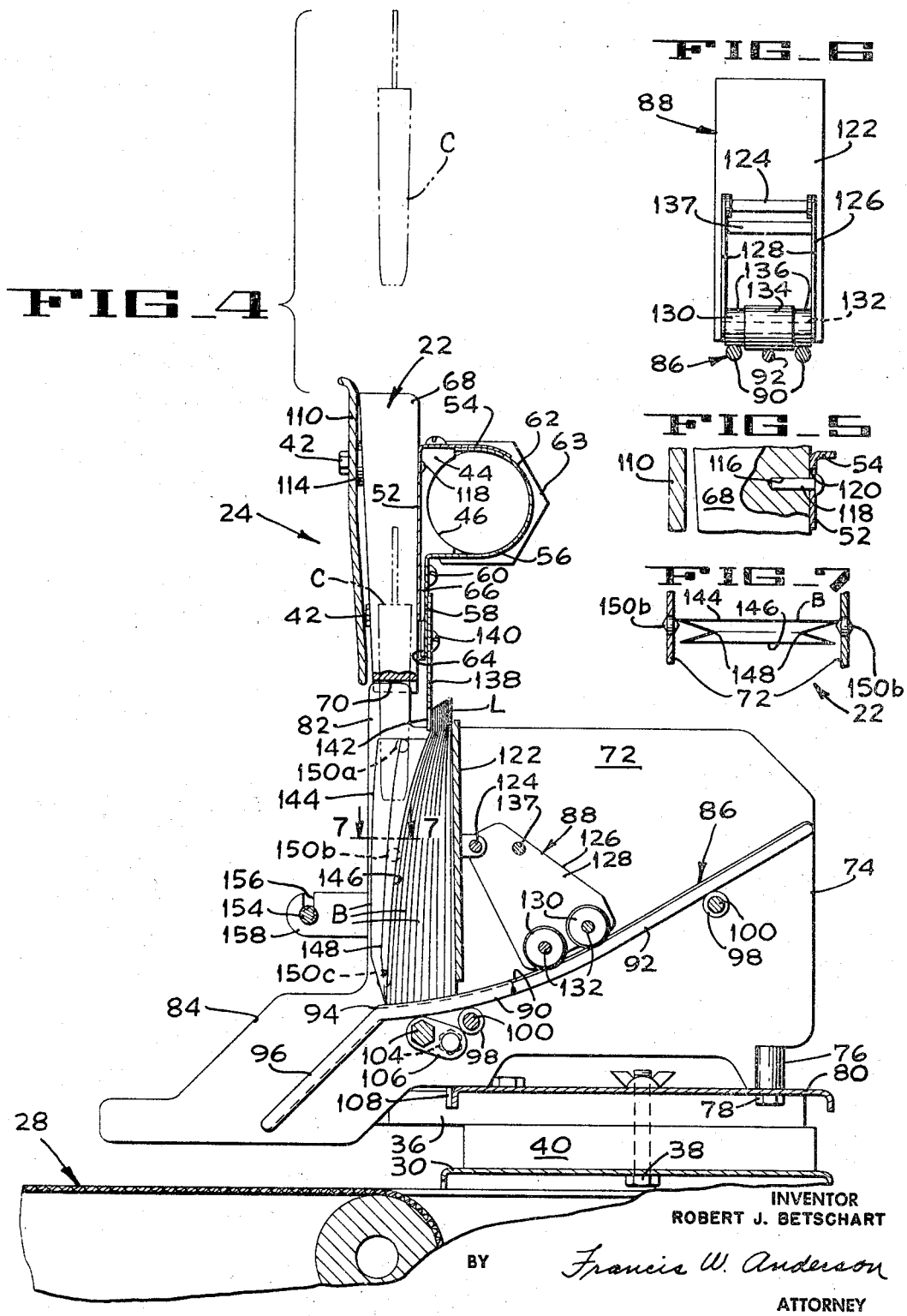

3,424,290
BAGGING APPARATUS
Robert J. Betschart, Sacramento, Calif., assignor to FMC Corporation, San Jose, Calif., a corporation of Delaware
Filed Jan. 28, 1966, Ser. No. 523,598
U.S. Cl. 193—2
Int. Cl. B65g 11/00; B65b 43/36
4 Claims

ABSTRACT OF THE DISCLOSURE

An adjustable chute for guiding a plurality of stick confections into bags has pivotally mounted side guides formed of upper pivoted guide bars and walls extending downwardly from the bars and loosely connected thereto with tongue and slot connections. The wall spacing is adjusted by oppositely threaded studs.

CROSS REFERENCE TO RELATED APPLICATION

The gravity feed carriage for the bags is claimed in a divisional application, Ser. No. 718,287, filed Feb. 8, 1968 (SJ 4688).

This invention relates to an improved bagging apparatus for packaging frozen stick confections.

Bagging apparatus of the type disclosed by this invention is shown in U.S. Patent 2,842,921 which is incorporated herein by reference.

Stick confection machines are designed to form, coats, and package confections of a great variety of shapes and sizes. Accordingly, it is necessary to make appropriate changes in the machine in order to process a new shape or size of confection.

Experience with the bagging apparatus of the referenced patent revealed several problems, the most important being its inability to properly guide a frozen confection into an open bag. This problem became particularly acut when it was desired to change the size of the confection which also necessitated changing the size of the bag.

Of equal importance to this problem of size change is the inability of the bag feeding mechanism to apply equal pressure to a stack of collapsed bags so that when the forwardmost bag is expanded it assumed a position which reduced the chances of the dropping confection to enter the bag opening.

Accordingly, it is an object of this invention to provide a new and improved bagging apparatus for a frozen confection machine.

Another object of this invention is to provide a bag magazine which can be adjusted to accommodate bags of different dimensions.

Another object is to insure guiding a confection to register with the mouth of the expanded bag.

Another abject is to guide a falling confection into an expanded bag irrespective of the size of the bag.

Another object of this invention is to apply a substantially equally distributed pressure to a stack of folded bags and thereby insure proper presentation of the forwardmost bag to a falling confection.

These and other objects of this invention will be apparent from the following description and the accompanying drawings in which:

FIGURE 1 is a perspective of a confection forming machine showing that portion of the machine at which the confections are deposited in bags.

FIGURE 2 is an enlarged front elevation of the gagging apparatus shown in FIGURE 1.

FIGURES 3 and 4 are transverse sections taken substantially along the planes 3-3 and 4-4 respectively of FIGURE 2.

FIGURE 3A is fragmentary top plan of FIGURE 3.

FIGURE 5 is an enlarged section taken substantially along the line of 5-5 of FIGURE 2.

FIGURE 6 is a rear view of the bag weight assembly shown in Figure 4.

FIGURE 7 is partial section taken along the line 7-7 of FIGURE 4.

Referring now to FIGURE 1 there is shown a confection machine, generally indicated by the numeral 10, which incorporates the novel bagging apparatus of this invention. The machine includes a main frame 12 provided with suitable legs 14 for supporting the machine above the floor. A conveyor frame 16, located vertically above the main frame, and supported in that position in part by vertical uprights 18, carries an intermittently operable confection conveyor 20 which transports longitudinally adjacent rows of confections C through the various processing stations of the apparatus. The confection conveyor is associated with means, not part of this invention, for simultaneously releasing an entire row of confections when they are substantially in a position shown in FIGURE 1 to the novel bagging apparatus 24. The released confections drop through aligned chutes 22 and are deposited in open bags held in position at the bagging station 24. High velocity air, supplied to a manifold by a conduit 26, opens the bags prior to release of the confections. After the confections have been packaged the force of the falling confection serves to propel the bagged confections to a conveyor 28, whereupon they may be manually gathered and packed in suitable boxes if desired or conveyed to a bag sealing mechanism.

Since confection producing machines of the type to which this invention relates are designed to make and package confections of various sizes it was heretofore necessary to replace the entire bagging station 24 each time a different size confection was to be processed. For example, bags range in sizes from approximately six inches to nine inches accordingly requiring the bagging station to be changed for such size variations.

It is a basic feature of this invention to provide a bagging apparatus which can be modified to accommodate bags of various sizes without requiring a separate bagging station for each size bag. In addition, the guide chutes 22 are arranged to properly direct a falling confection to the open bag.

The bagging station 24, shown in front elevation in FIGURE 2 and in side elevation in FIGURES 3 and 4, is supported on a base plate 30 which in turn is carried by the frame of the machine. On the base plate 30 there are mounted transversely spaced and aligned support structures 32L, the left-hand structure, and 32R, the right-hand structure, which carry the bagging station 24. Each of these support structures are identical accordingly, description of one will suffice for both. As shown in FIGURE 3 the right-hand support structure 32R is generally L-shaped and includes a vertical member 34 and a generally horizontal mounting bar 36 which is attached to the base plate 30 by a suitable bolt fastener 38. Between the mounting bar 36 and the base plate 30 there is provided a spacer bar 40 whose thickness is dependent upon the size of confection being processed. For example, as the length of the confection increases, the thickness of the spacer bar 40 would decrease. In certain instances the length of the confection is such that the spacer bar 40 may be entirely removed whereupon the horizontal bar 36 would rest upon the base plate 30.

On the upper end and on the rearward face of the vertical member 34 there is secured, by bolts 42, a manfold block 44 formed with a circular concave surface 46 and a downward extension 48. As shown in FIGURE 3A, which is a fragmentary top plan of FIGURE 3, the manifold block 44 is of substantially the same width as the vertical member 34. A similar manifold block is mounted on the vertical member of the support 32L. Extending between the manifold blocks and located in grooves 50 there is a front manifold cover plate 52. The upper portion of this cover plate is bent rearwardly (to the right as viewed in FIGURE 3) to define a horizontally projecting portion 54 which forms part of the manifold passageway. The manifold also includes a back plate 56 having a straight portion 58 attached to the downward extension 48 of the manifold block by screws 60 and a generally semicircular portion 62 underlying the portion 54. The end of the manifold is closed by cap 63.

At equally spaced intervals adjacent the bottom edge of the straight portion 58 generally triangular projecting bosses 64 are formed. As will hereinafter be explained in detail these bosses serve the purpose of directing the air from the manifold for inflating the bags. The front manifold cover plate 52 and the straight portion 58 are located in relatively close adjacency to provide a passageway 66 which directs air from the manifold downwardly toward the bags.

Referring now to FIGURE 2 it will be seen that the novel bagging station of this invention includes a plurality of confection guide chutes 22 defined by elongate, laterally spaced, upper guide or divider bars 68 pivotally mounted on the manifold front cover plate 52 and overlying the triangular bosses 64. Lower ends of the divider bars are grooved or slotted at 70 to receive therein downwardly extending walls or partitions 72. The divider bars 68 together with the partition 72 define channels for guiding the dropping confection into an open bag. As shown in FIGURE 4 the partitions 72 have a rearwardly extending generally rectangular portion 74 on the lower rearward end of which there is a lug 76 having a threaded bore for threadedly receiving a bolt 78 attaching the partition to a mounting plate 80. All of the partitions with the exception of the centrally located one 72a are laterally pivotally movable about the axis of the bolts 78.

Still referring to FIGURE 4 it will be noted that the upper forward end of the partition 72 is provided with a tongue portion 82 which is received and relatively freely fitted within the slot 70 of the divider bar 68. The lower forward end of the partition has a forward extension 84 which serves to guide a bagged confection onto the conveyor 28.

Between the spaced partitions 72 there is provided a bag slide assembly 86 and a bag weight assembly 88, the latter being claimed in the aforesaid divisional application. The bag slide assembly 86 comprises transversely spaced rods 90 and a rod 92 of smaller diameter located therebetween. These rods are formed to define a gradual sloping runway terminating at 94 and a relatively steep inclined portion 96 for directing a bagged confection to the lower conveyor 28. The rods are rigidly connected together by being welded to short transverse tubular members 98 whose length is somewhat smaller than the width of the smallest bag to be used.

All of the partitions 72 and the intermediate bag slide assemblies 86 are connected together in a manner shown in FIGURE 2 by elongate tie rods 100 on the ends of which are threaded conventional acorn nuts 102. The tie rods 100 are of reduced diameter to provide enough play so that the partitions 72 may be laterally pivotally movable about the bolts 78. Also between each of the partitions 72 there is provided a short stud 104 having its ends threaded in the opposite hand. For example one end of the stud has a right hand thread and the other end a left hand thread. The studs are threadedly received in bosses 106 mounted on the partitions 72. As shown most clearly in FIGURE 2 it will be noted that the studs are staggered and that each boss 106 (FIG. 4) has two tapped holes. Upon rotation of a stud 104 the partitions on either side thereof may be drawn together or spread apart depending upon the direction in which the stud is rotated.

The central partition 72a is, however, held against lateral movement by a small slotted clip 108 which is welded on the forward edge of the mounting plate 80. By this arrangement the partitions 72 to the left and to the right of the partition 72a may be moved laterally.

The portion of the guide chutes 22 defined by the divider bars 68 is covered by an elongate plate 110 formed with drilled ears 112 through which extend the bolts 42. As shown in FIGURE 3, a small spacer block 114, located between the vertical member 34 and the ear 112 and which is drilled with a clearance hole for passage of the bolt 42, is provided for spacing the plate 110 forwardly of the divider bars 68 so that these bars are free to swing about their pivotal mounting.

The manner in which the divider bars 68 are pivotally mounted on the front cover plate 52 of the manifold is shown in FIGURE 5. The back face of a divider bar 68 has a blind hole 116 in which is secured a headed pin in the form of a rivet 118. The shank of the rivet is of sufficient length so that the shoulder formed by the rivet head is spaced from the surface of the divider bar a distance which is at least equal to the thickness of the plate 52. In the plate 52 a hole 120 is provided of sufficient diameter so that the head of the rivet may easily pass therethrough. When the rivets associated with each divider bar are passed through the hole 120 they drop downwardly seating the head of the rivet against the surface of the plate 52 as shown in FIGURE 5. The divider bars 68 are therefore free to pivot about the rivets 118.

Bags to be filled with confections are located between the partitions 72 with their open ends located upwardly. The bag weight assembly 88 which comprises a presser plate 122 pivotally connected at 124 to a carriage 126 urges the stack of bags forwardly toward the chutes 22. As shown in FIGURE 6 the carriage 126 is formed with similarly shaped side plates 128. Between these plates a pair of rollers 130 are rotatably mounted on shafts 132 which are in turn secured to the side plates 128. Each of these rollers has a central enlarged diameter portion 134 in rolling engagement with the small rod 92 and reduced diameter portions 136 on either end in rolling engagement with the rods 90 which are of larger diameter. The shoulders which are formed by the transition between the large diameter 134 and the small diameters 136 constrain the bag weight assembly to roll along the slide assembly 86 without skewing thereby feeding the stack of bags properly. For purposes of handling the bag weight assembly 88 a transverse rod 137, attached to side plates 128, is provided.

Each bag shown (FIGURE 4) has its rearward partition extended upwardly to form a lip, all of such lips being generally indicated by the letter L, which encounters what will be called for convenience of description a fishtail plate 138 whose configuration is best shown in FIGURE 2. This plate is of a length sufficient to extend from the left hand support structure 32L to the right hand support structure 32R. The plate 138 is attached to the downward extension 48 of the manifold block 44 by screws 140. As shown in FIGURE 2, the lower edge of the plate 138 is formed with a plurality of diverging fingers 142 which engage the lip L of each bag as it is presented for receiving a falling confection. There are a pair of these fingers for each of the guide chutes 22. Although not shown in the holes in the plate 138 through which the screws 140 extend may be vertically elongated so that the plate may be positioned to properly position the fingers 142 against the lip of the bags.

FIGURE 7 is an enlarged fragmentary plan view showing a bag B located between adjacent partitions 72 and prior to being expanded. The front face 144 of the bag B is narrower than the rear face 146 and they are interconnected by folded gussets 148. Each partition 72 carries adjacent its forward vertical edge spaced buttons 150a, 150b, and 150c. These buttons have generally conical projections and are arranged to engage the fold of each bag defined by the back face 146 and a gusset 148. The forwardmost bag of each stack, in addition to having its lip engaging the fingers 142, also engage the buttons 150b and 150c. While so restrained air issuing through the air passageway 66 enters the bag and expands it thereby preparing the bag for reception of the falling confection. The uppermost button 150a is only effective to engage bags of the largest size, which, according to present commercial practices is approximately nine inches long.

The bag width adjustment of the present invention operates in the following manner. Let it be assumed that the distance between the partitions 72 must be increased to accommodate a bag of greater width. Starting from the central partition 72a the studs 104 on either side are rotated to establish the desired width dimension. Accordingly, the partitions on either side of the central partition 72a are moved away therefrom. The partitions pivot about the lower rearward bolts 78 and while doing so, the divider bars 68 corresponding to these partitions will pivot slightly with the rivets 118 acting as a pivot point. Accordingly, the divider bars 68 are always in position to guide a falling confection into a bag which is expanded to receive it.

Air is supplied to the manifold assembly by the conduit 26 at all times. As soon as the forwardmost smaller bag of each stack engages the fingers 142 and the buttons 150b and 150c, the high velocity stream of air is directed into the mouth of the bag expanding it to the shape shown in FIGURE 4. The triangular projections 64 serve the purpose of channeling the air to each bag. The projections 64 not only separate the issuing air into various streams but also increase the velocity of the air due to the decrease in cross-sectional flow area formed by these projections. Such an increase in velocity is particularly desired in order to effect rapid expansion of the bag as soon as it is in position.

The bag weight assembly 88 allows the presser plate 122 to assume a position which will evenly distribute the weight of this assembly to the stack of bags irrespective of the depths of the stack. Due to such an even distribution of force the forwardmost bag in each stack assumes a bowed configuration positioning the mouth of the bag at a slight inclination with respect to the stream of air issuing from the manifold. Accordingly, repeated and reliable expansion of the bags is brought about.

In the event it is desired to modify the bagging station 24 to process confections which will require the largest size bag it requires removal of the spacer bar 40 thus bringing the mounting bar 36 in contact with the surface of the base plate 30. The manifold blocks 44 are replaced with blocks whose downward extension 48 is approximately one inch shorter and inserting divider bars 68 which are also shorter in length. These modifications can be accomplished by experienced operating personnel in a very short period of time. By adapting the bagging station to be so modified the expense of purchasing several bagging stations for different size bags is no longer necessary.

Once a confection falls into an inflated bag the force of the fall is sufficient to pull the lip L downwardly out of engagement of the fingers 142. The filled bag slides along the incline 96 onto the conveyor 28. If for some reaon the filled bag should fall forwardly with the confection stick forwardmost thus striking the conveyor 28 the confection would be damaged and rendered commercially unacceptable. To avoid this possibility a knock-down bar 154, having grooved ends fitted in slots 156 is mounted on lugs 158 which are welded to the members 34. This bar arrests such tilting or rotation of the filled bag.

In operation the confection conveyor 20 positions a row of confections C vertically above the guide chutes 22. The entire row of confections is released and they fall into the chutes for reception by a bag which has been opened by the air supplied by the conduit 26. The force of the falling confection dislodges the bag from the fingers 142, and propels it along the incline 96 to the conveyor 28.

Thus according to the above described invention it should be readily apparent that the new and improved bagging station is readily adapted to process confections of various sizes. By interconnecting the divider bars 68 and the partitions 72, the continuous chutes 22 accurately guide each falling confection into an expanded bag. Further pivotal connection of the presser plate 122 insures an evenly distributed force against the stack of bags and maintains such distribution as the number of bags in the stack diminishes.

What is claimed is:

1. An adjustable chute for guiding gravity fed stick confections into an expanded bag, said chute comprising laterally spaced upper guide bars transversely pivotally connected to a support plate, downwardly extending walls interconnected to the lower end of said guide bars and having located therebetween an expanded bag, and means for moving said walls toward and away from each other to accommodate bags of various widths, wherein such movement of said walls causes concurrent movement of said guide bars to thereby direct the confection to the expanded bag.

2. The combination of claim 1 wherein said guide bars are provided with a slot which freely receives said walls.

3. The invention according to claim 1 further comprising a tongue portion on said walls, and a groove on the lower end of said bars, said tongue being relatively loosely fitted in said groove.

4. The invention according to claim 1 wherein the pivotal connection of said guide bars comprises a headed pin carried by said bar so that the shoulder defined by the juncture of the head and the shank is spaced a desired distance from the surface of said bar, said bar being supported on a plate which has a hole slightly larger in size than the head of said pin so that when the head is inserted through the hole the plate is located between such shoulder and a surface of the bar thus permitting pivotal movement of such bar and yet allowing said bar to be easily removed.

References Cited

UNITED STATES PATENTS

| | | | |
|---|---|---|---|
| 2,622,545 | 12/1952 | Hummel | 193—2 |
| 2,629,369 | 2/1953 | Nelson | 53—189 |
| 2,842,921 | 7/1958 | Rasmusson | 53—189 |

EVON C. BLUNK, Primary Examiner.

H. C. HORNSBY, Assistant Examiner.

U.S. Cl. X.R.

53—189, 385